Figure 1:
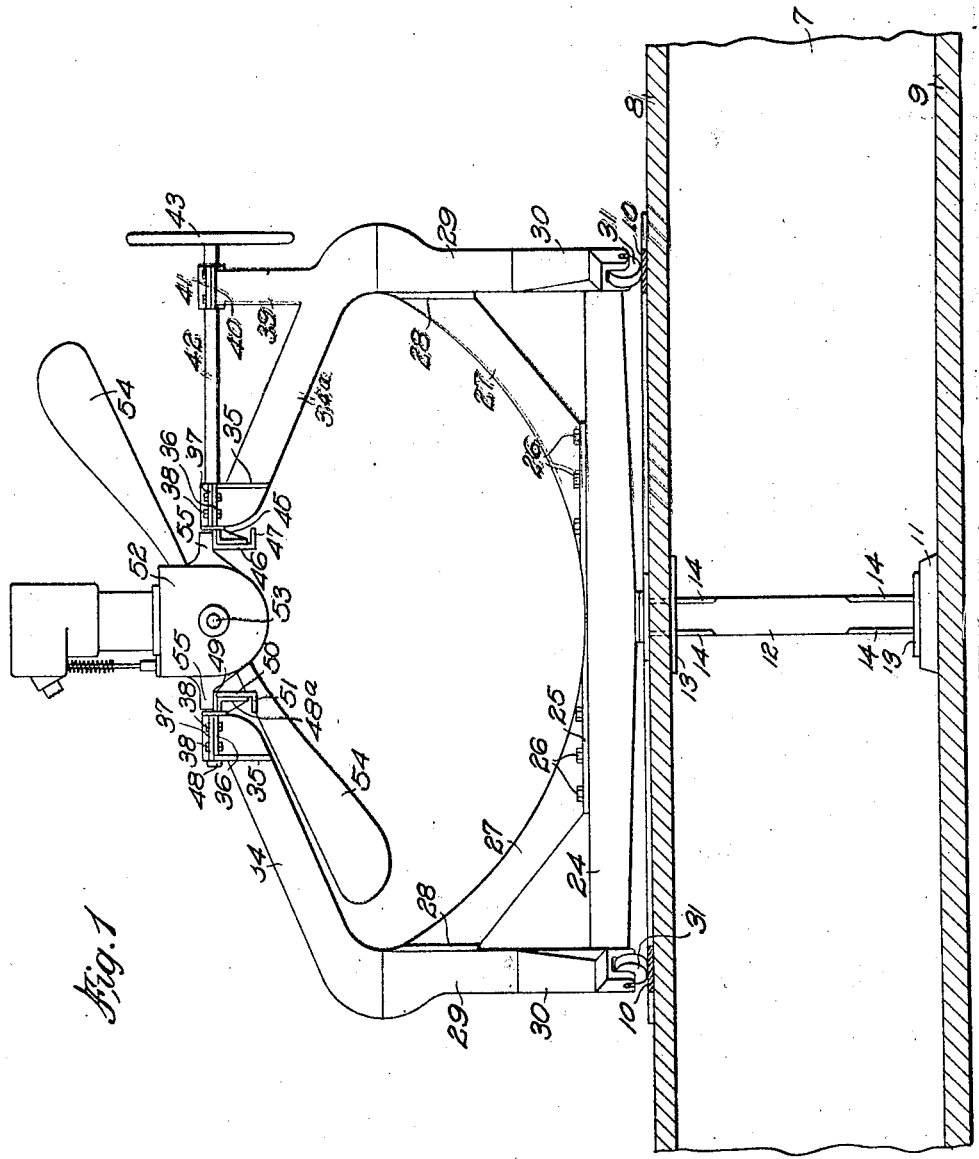

V. GROVE.
MOUNTING FOR PROPELLER SHAFTS.
APPLICATION FILED SEPT. 17, 1915.

1,187,309.

Patented June 13, 1916.
3 SHEETS—SHEET 1.

WITNESSES
F. D. Sweet.
W. Harrison

INVENTOR
Victor Grove
BY Munn & Co
ATTORNEYS

V. GROVE.
MOUNTING FOR PROPELLER SHAFTS.
APPLICATION FILED SEPT. 17, 1915.
1,187,309.
Patented June 13, 1916.
3 SHEETS—SHEET 2.
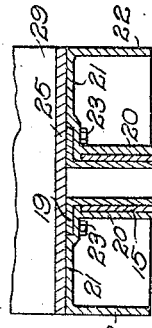
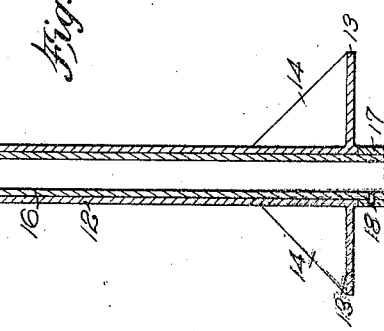
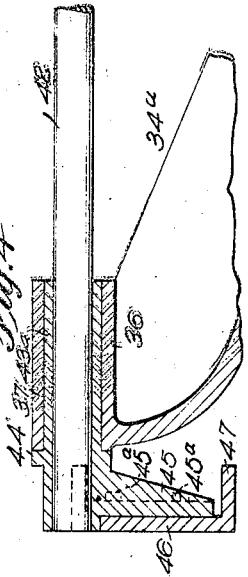
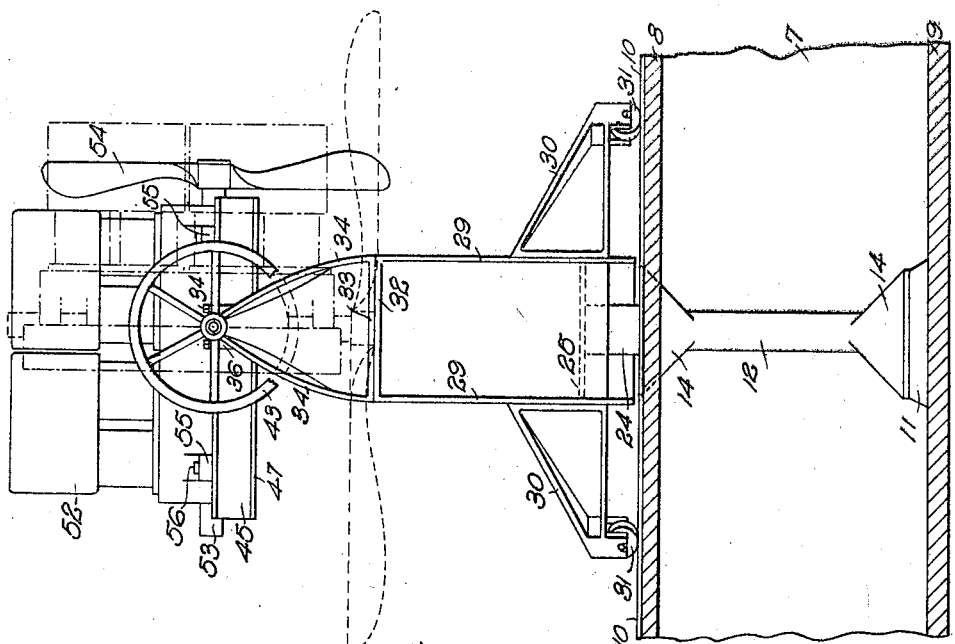
WITNESSES
F. D. Sweet
W. Harrison
INVENTOR
Victor Grove
BY
ATTORNEYS V. GROVE.
MOUNTING FOR PROPELLER SHAFTS.
APPLICATION FILED SEPT. 17, 1915.
1,187,309.
Patented June 13, 1916.
3 SHEETS—SHEET 3.
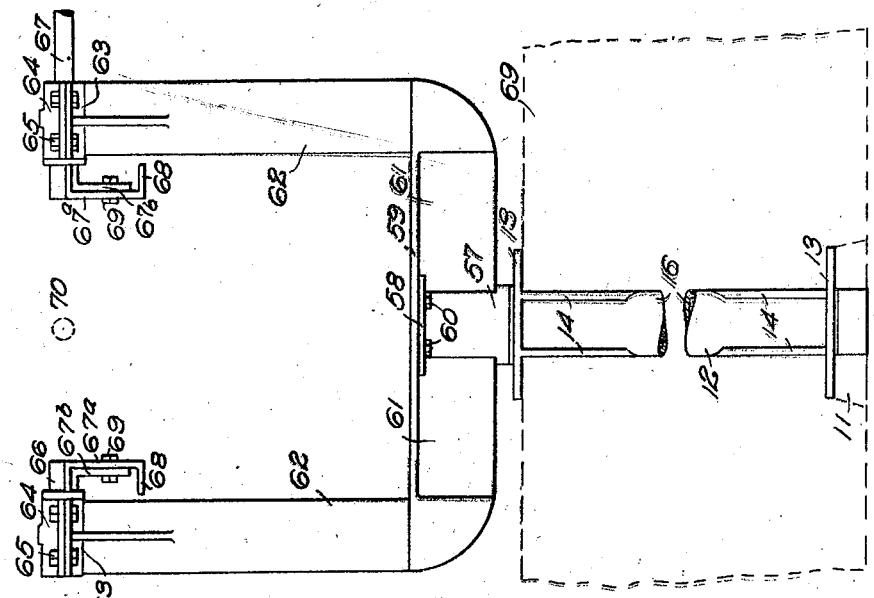
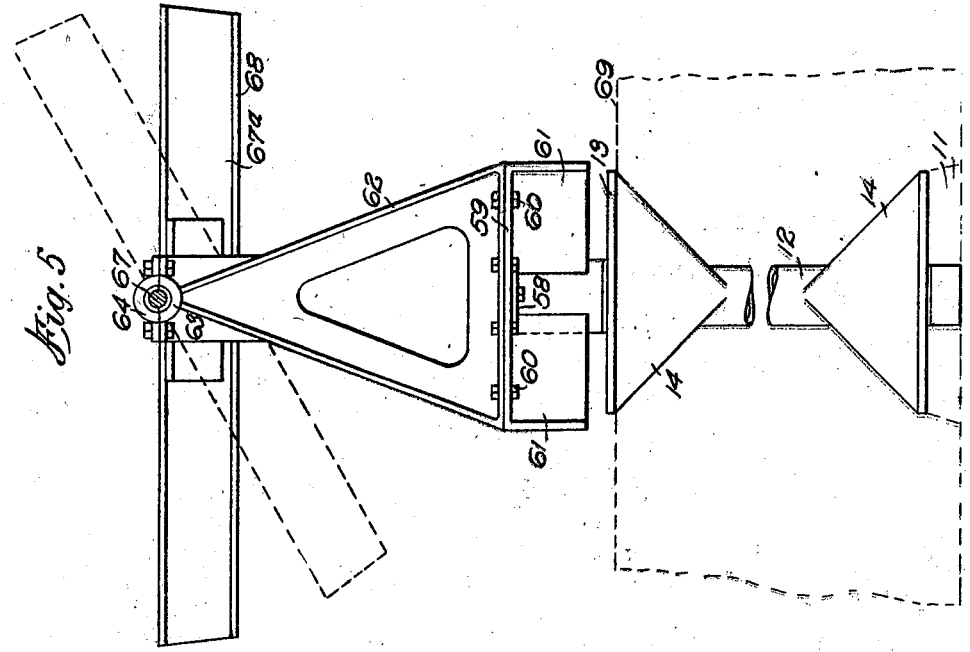
WITNESSES
F. D. Sweet.
W. Harrison.
INVENTOR
Victor Grove
BY
ATTORNEYS

UNITED STATES PATENT OFFICE.

VICTOR GROVE, OF CALLAO, MISSOURI.

MOUNTING FOR PROPELLER-SHAFTS.

1,187,309.

Specification of Letters Patent.   Patented June 13, 1916.

Application filed September 17, 1915.   Serial No. 51,216.

*To all whom it may concern:*

Be it known that I, VICTOR GROVE, a citizen of the United States, and a resident of Callao, in the county of Macon and State of Missouri, have invented a new and Improved Mounting for Propeller-Shafts, of which the following is a full, clear, and exact description.

My invention relates to mountings for propeller shafts and admits of general use, but is of peculiar value in connection with propeller shafts used for driving boats, aeroplanes, and even cars, in instances where it may be practicable to use propellers, and, in fact, the invention may be employed in all relations where a propeller can be used and in which it is desirable to shift the axis of rotation of the propeller to relatively different angles.

More particularly stated my invention comprehends a propeller mounting so arranged that the axis of rotation of the propeller may be shifted into an infinite variety of angular directions.

My invention further comprehends a propeller and mounting therefor, in which the various parts are so arranged, proportioned and balanced that the shifting of the direction of the axis of the propeller shaft may be accomplished without affecting the center of gravity of the mechanism as a whole.

My invention further contemplates various improvements in mountings for propeller shafts for the purpose of improving the general efficiency thereof.

My device may be used for both propelling and steering vehicles, as well as boats and other marine vessels, together with balloons, aeroplanes, hydroplanes, and various other movable bodies which it is desired to propel and guide, whether on land, in or on water, or in atmospheric air.

My invention contemplates, among other things, a device for supporting, securing and carrying a prime mover, such as an engine or an electric motor, so as to maintain the same in proper working relation to the propeller and various other parts immediately affected.

A typical application of my invention is illustrated in the accompanying drawings forming a part of this specification, and in which like reference characters indicate like parts.

Figure 1 is a view partly in section and partly in side elevation, showing my device as used in connection with a propeller suitable for acting upon atmospheric air in order to drive and also guide or steer the device and mechanism supporting the same; Fig. 2 is a view partly in section and partly in end elevation, showing the mechanism appearing in Fig. 1; Fig. 3 is a fragmentary section showing in detail the reversible tubular king post and parts immediately associated therewith; Fig. 4 is a fragmentary section showing one of the bearings for supporting the prime mover and propeller; Fig. 5 is a fragmentary side elevation showing another form of my invention; Fig. 6 is a fragmentary end elevation of the same.

The body portion 7 is provided with deck portions 8, 9, these parts together constituting a movable platform, which may, if desired, be the hull or body portion of a boat. Mounted upon the deck portion 8 is a supporting rail 10. Secured upon the deck portion 9 is a pedestal 11, which may, if desired, be a wooden block. A tubular sleeve 12 is provided with anchor plates 13, the latter being secured firmly to the deck portions 8, 9. The sleeve 12 is further provided with webs 14 integral with it and with the anchor plates 13, the webs serving as braces. The sleeve 12 is further provided with a portion 15 extending upwardly and having generally the form of a cylindrical neck.

Extending through the sleeve 12 and revoluble relatively to the same is a tubular sleeve 16, serving the purpose of a king post. This sleeve, at its lower end, is provided with a collar 17 held rigidly upon it by a pin 18, this collar 17 serving as a limiting stop for preventing upward travel of the sleeve 16 relatively to the sleeve 12. The upper end of the sleeve 16 is provided with an annular flange 19.

Encircling the neck portion 15 of the sleeve 12, is a cylindrical member 20 provided with an outwardly-extending annular portion 21, the outer edge of which is integral with an annular flange 22. By means of bolts 23, the annular member 21 is secured rigidly to the flange 19 of the sleeve 16. The parts 20, 21 and 22 constitute a beam 24 arranged above the deck portion 8. By this arrangement, the weight of the sleeve 16 and of the various parts supported thereby, rests directly upon the stationary sleeve 12, the sleeve 16 and parts carried by it being revoluble relatively to this stationary sleeve.

Mounted upon the beam 24 is a plate 25 secured in position by bolts 26. The beam 24 and parts carried by it are revoluble with the sleeve 16. Integral with the plate 25 and extending upwardly in opposite directions therefrom, are two arms 27, 27, which are provided with flanges 28. A pair of end frames 29 are mounted upon the ends of the beam 24, and secured upon the end frames 29 are caster frames 30, the latter being provided with supporting wheels 31, which rest revolubly upon the supporting rail 10. The end frames 29 are provided with horizontally-extending plates 32, and resting upon these plates are horizontally-extending plates 33, the latter being integral with yoke arms 34, 34ª of the general form shown in Figs. 1 and 2. The yoke arms 34, 34ª are provided with flanges 35, which serve as braces for journal boxes 36. These journal boxes are provided with detachable caps 37, held in position by bolts 38, thus forming annular or cylindrical bearings.

Mounted upon the yoke arms 34ª and integral therewith, is a post 39, which carries a journal box 40, the latter being provided with a cap 41 and constituting therewith a cylindrical or annular bearing. A revoluble shaft 42 engages the bearing or journal box 40 and one of the bearings or journal boxes 36, and is provided with a hand wheel 43, by the rotation of which the shaft 42 is turned.

Mounted rigidly upon the revoluble shaft 42, is a cylindrical collar 43ª, provided with an annular bead 44, and with a downwardly-extending lug 45. An angle beam 46 provided with a horizontally-extending web 47, is secured rigidly to the lug 45, by bolts 45ª, as may be understood from Fig. 4. The parts are so arranged that when the shaft 42 is rocked or turned, the angle beam 46 is tilted in the general direction of its length, to practically any desired angle.

The other journal box 36 supports a comparatively short revoluble shaft 48, as may be understood from Fig. 1, this shaft being in alinement with the shaft 42. The mounting of the shaft 48 in the journal box 36 is somewhat similar to that of the shaft 42 in its journal box. Carried by the shaft 48 is a sleeve 49, similar to the sleeve 43ª above described, and provided with a downwardly-extending lug 48ª. Secured to this lug is an angle iron 50, provided with a laterally-extending web portion 51, and corresponding to the angle iron 46 with its web portion 47.

The prime mover is here shown as an internal combustion engine, and is provided with a propeller shaft 53, and with a propeller 54 carried by this propeller shaft. The prime mover is also provided with bed plates 55, which are, by bolts 56, secured rigidly upon the angle beams 46, 50. The entire weight of the prime mover is thus supported upon the shafts 42 and 48, and being connected rigidly to the latter, the prime mover may be tilted to various angles by rotation of the hand wheel 43. The parts are so arranged and the weight of the prime mover so distributed, that the center of gravity of the prime mover is intersected by both the axial line of the shafts 42 and 48, and the axis of the rotation of the propeller shaft.

The entire framework above the deck 8 may be turned in a horizontal plane, as the supporting wheels 31 are free to roll upon the annular supporting rail 10. Therefore, the propeller shaft 53 may be turned to any desired angle within the horizontal plane of rotation. By turning the hand wheel 43, the propeller shaft may be shifted to practically any desired vertical angle. Therefore, the propeller shaft has a universal movement relative to its support, and no matter how the prime mover and propeller may be shifted, the center of gravity of the entire system remains unchanged.

The operator may use the propeller either for driving the boat or other structure upon which it is mounted, or for steering the boat or other structure in any direction in which it is capable of traveling. When the device is used upon aeroplanes, the propeller shaft may be so shifted as to have the tendency to drive the machine in practically any desired direction, and the same propeller may be employed for the joint purpose of steering and propelling.

In Figs. 5 and 6, I show a slightly different form of my apparatus, the proportions being varied so as to enable the axis of rotation of the propeller to be shifted in absolutely any given direction. For some purposes, the mechanism here shown may be preferable to that appearing in the other figures. The stationary sleeve 12 and the revoluble sleeve 16 extending through it and revoluble relatively thereto, have the same form as before. Mounted upon the upper end of the revoluble sleeve 16, is a casting 57, provided with flanges 58. Engaging these flanges is an angle beam 59, secured in position by bolts 60. The angle beam 59 is provided with downwardly-extending webs 61.

The parts just described together constitute a horizontal beam. Extending upwardly from the ends of this beam are two other beams 62, which, at their upper ends, are provided with journal bearings 63. These bearings are provided with detachable caps 64, held in position by bolts 65. Two shafts 66, 67, similar to the shafts 48 and 42 above described, are supported by the bearings 63. Angle beams 130

67ª provided at their bottoms with laterally-extending flange portions 68, are supported upon downwardly-extending lugs 67ᵇ, the latter being carried by sleeves, which encircle the shafts 66 and 67. The engine or other prime mover is mounted upon the angle beams 67ª, and is provided with a propeller shaft 70.

By turning the casing 57 and parts carried by it, the propeller shaft 70 is rotated in a horizontal plane, and by turning or rocking the angle beams 67ª in a vertical plane, the propeller shaft 70 is turned or rotated to any desired vertical angle. Except as above described, the action of the mechanism is identical with or closely analogous to that described in connection with Figs. 1 to 4, inclusive.

I do not limit myself to the precise construction shown as variations may be made therefrom without departing from the spirit of my invention.

Having thus described my invention, I claim as new and desire to secure by Letters Patent:

1. A device of the character described, comprising a pivoted supporting frame mounted on a vertical pivot, and provided with wheels, a circular track on which the wheels travel, a prime mover provided with a propeller and pivotally mounted in the frame, and means connected with one of the pivots of the prime mover for turning the same.

2. A device of the character described, comprising a pivoted supporting frame having upwardly and inwardly extending and spaced members, a prime mover pivotally mounted between the members of the supporting frame and provided with a propeller, and means connected with one of the pivots of the prime mover for turning the same.

3. A device of the character described, comprising a pivoted supporting frame having upwardly and inwardly extending members spaced from each other, said frame being mounted on a vertical pivot and provided with wheels, a circular track on which the wheels travel, a prime mover pivotally mounted between the members of the supporting frame, and means for swinging the prime mover on its pivots.

4. A device of the character described comprising a stationary shaft of tubular form; a movable shaft of tubular form extending through said stationary shaft; a supporting deck disposed adjacent said stationary tubular shaft; a supporting rail of annular form mounted upon said deck; a revoluble frame connected rigidly with said revoluble tubular shaft; caster members connected with said frame and provided with supporting wheels engaging said annular supporting rail so as to allow said frame to turn; a prime mover mounted upon said frame and provided with a propeller shaft; and means for turning said prime mover and said propeller shaft so that said propeller shaft assumes different angles relative to said revoluble frame.

5. A device of the character described comprising a stationary post of tubular form; a revoluble post of tubular form extending into said stationary post of tubular form; a casing carried by said revoluble post of tubular form and secured relatively to the same; a beam mounted upon said casing and provided with downwardly-extending web portions engaging the same; supporting members mounted upon the ends of said beam and provided with journal boxes; and means for mounting a prime mover having a propeller and a propeller shaft upon said supporting members.

6. A device of the character described comprising a stationary post of tubular form; anchor plates carried by said stationary post and disposed adjacent the ends thereof; web members carried by said stationary post and engaging said anchor plates for the purpose of bracing said stationary post; a revoluble post of tubular form extending through said stationary post; a collar mounted adjacent one end of said post of tubular form and serving as a limiting stop for preventing end movement of said revoluble post relatively to said stationary post; a framework mounted upon said revoluble post; a prime mover carried by said framework; and a propeller shaft and a propeller in operative relation to said prime mover and supported upon said framework, said propeller and said propeller shaft being movable to different angles relatively to said framework.

7. In a device of the class described, a movable frame member provided with a pair of journal bearings; a pair of revoluble shafts engaging said journal bearings and adapted to turn relatively thereto, said shafts being in alinement; means for turning one of said shafts; and a prime mover connected with both of said shafts and provided with a propeller shaft, the axis of rotation of said propeller shaft intersecting the axis of rotation common to said first-mentioned shafts.

8. A device of the character described comprising a pair of supporting members revoluble in a predetermined plane; a pair of journal bearings carried by said supporting members; a pair of shafts, each supported by one of said journal bearings, said shafts being in axial alinement with each other; a prime mover supported directly upon said shafts; and means controllable at the will of the operator for turning one of said shafts and thereby turning said prime mover and the other of said shafts, said prime mover being provided with a propeller shaft so disposed that the axis of said propeller shaft intersects the axial line of said first-mentioned shafts, the distribution of weight of said prime mover being such that it coincides with the intersection of the axis of the propeller shaft with that of said first-mentioned shafts.

9. A device of the class described, comprising a supporting frame mounted on a vertical pivot, said frame having upwardly and inwardly inclined members terminating short of each other and with downwardly extending members carrying wheels, a circular track upon which the wheels travel, alined shafts each mounted in a member of the frame, a prime mover having a propeller and connected with each of said shafts, and means connected with one shaft for turning it.

VICTOR GROVE.

Witnesses:
JOHN HARDIN MATHIS,
JOHN T. HOLMAN.